United States Patent Office 3,527,743
Patented Sept. 8, 1970

3,527,743
PROCESS FOR MAKING POLYVINYL CHLORIDE
Ronald L. Friedman, San Rafael, Donald W. Wood, San Pablo, and Roger N. Lewis, Pinole, Calif., assignors to Argus Chemical Corporation, a corporation of Delaware
No Drawing. Filed May 18, 1967, Ser. No. 639,269
Int. Cl. C08f 3/30
U.S. Cl. 260—92.8    1 Claim

ABSTRACT OF THE DISCLOSURE

Preparation of polyvinyl chloride and its copolymers from monomers using unsymmetrical diacyl peroxide initiators having a secondary or tertiary carbon atom in the alpha position relative to the carbonyl groups by which both the total yield of polymer and the rate of its formation is significantly increased.

---

This invention relates to the polymerization of selected monomers for the formation of polyvinyl chloride and copolymers thereof. More particularly, the invention relates to the use of certain unsymmetrical diacyl peroxides as the initiators in the reaction for the formation of such polymers.

The use of organic peroxides as initiators of polymerization reactions is well established. In the production of polyvinyl chloride and its copolymers, the use of lauroyl peroxide has become relatively standard in the polyvinyl chloride (PVC) industry. The present invention is based upon the discovery of the unique advantages in using certain unsymmetrical diacyl peroxides for the initiation of the polymerization reaction for the formation of PVC and its copolymers. In comparison with the lauroyl peroxide commonly used in this reaction, this limited group of diacyl peroxides increases the total yield of polymer as much as eight fold. In addition to the increased yields, the rate of reaction is substantially increased providing obvious advantages for a commercial application in terms of optimal utilization of capital equipment. The uniqueness of the group of unsymmetrical diacyl peroxides to be described in terms of vinyl chloride polymerization is most unexpected when considering that this same group of catalysts is relatively ineffective when used to initiate the polymerization of other monomers such as styrene, methyl methacrylate, and diallyl phthalate.

In accordance with the present invention, the foregoing advantages of increased yield and reactivity are obtained by using as the initiator for PVC and its copolymers an unsymmetrical diacyl peroxide in which one of the alpha carbon atoms relative to the carbonyl carbon atoms of the acyl groups has not more than one hydrogen atom directly bonded thereto. In other words, one of the alpha carbon atoms is either a secondary or tertiary carbon atom. In exploring the compounds having such a structure, it has been found that superior results are obtained where the unsymmetrical diacyl peroxide is either acyclic and of a relatively low molecular weight (containing from 6–9 carbon atoms) or is an acyclic-alicyclic unsymmetrical diacyl peroxide. The low molecular weight acyclic materials have been found to be so effective in the initiation of PVC that even compounds in which the beta carbon atom instead of the alpha carbon atom is of the noted secondary or tertiary character, excellent results are also obtained.

The preferred compounds, the low molecular weight materials and those containing an alicyclic group, contain an alpha or beta secondary carbon atom and have the following formula:

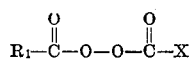

wherein: $R_1$ is an alkyl group; $R_1$ and $X$ are different; and $X$ is selected from the group consisting of cycloaliphatic groups and the group

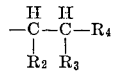

wherein: $R_2$ is selected from the group consisting of alkyl radicals and the hydrogen atom, provided $R_2$ is hydrogen only when $R_1$, $R_2$, $R_3$ and $R_4$ contain not more than 5 carbon atoms; $R_3$ is selected from the group consisting of alkyl groups and hydrogen provided $R_3$ is an alkyl group when $R_2$ is a hydrogen atom; and $R_4$ is selected from the group consisting of alkyl groups and the hydrogen atom provided $R_4$ is an alkyl group when $R_2$ is hydrogen.

The new compositions used in the methods of this application are described and claimed in copending patent application Ser. No. 639,314, filed May 18, 1967.

Within the above group best results to date have been found with diacyl peroxides wherein $R_1$ is a methyl group. $X$ may be any cycloaliphatic group such as a cyclohexyl group or a cyclohexenyl group, either of which may contain suitable alkyl substituents, as well as larger ring structures such as the saturated or partially saturated naphthyl ring. Generally, however, the cyclo group will be relatively small for practical purposes, i.e., less than about 10 carbon atoms so as to maintain a relatively high active oxygen content in the molecule.

As noted, where the molecule is acyclic, optimum results are obtained wherein the molecule contains from 6–9 carbon atoms. In the broadest aspects of the invention, acyclic molecules are contemplated of much larger size, as long as they contain the requisite alpha branched carbon atom and provided that the molecules are capable of substantially increasing the yield of PVC from vinyl chloride monomer as compared with the yield obtained with the use of an equimolar amount of the present industry standard of lauroyl peroxide. Again, however, molecular size will generally be limited to not more than about 20 carbon atoms so that a relatively high active oxygen content is provided.

It will be appreciated that the cyclic compounds included within the processes of this invention provide the requisite type of alpha carbon atom. Note that the carbon atom bonded to the carbonyl carbon atom is of a secondary character by virtue of its participation in the ring structure because of which it is bonded to two carbon atoms of the ring. This same alpha carbon atom could, of course, be a tertiary carbon atom if it is also substituted with, for example, an alkyl group.

As noted, the process is applicable solely to the production of PVC and copolymers thereof. In practice, the present catalysts are used in the same manner that is now conventional in the industry when using lauroyl peroxide, for example. The polymerization of PVC and the usual monomers used for copolymerization therewith is in general conducted as a suspension polymerization process in water. As before, it is contemplated that the present catalysts will be used in various amounts ranging between .05–2% by weight of the monomers in the solution. Polymerization may be conducted between −20° to 90° C., but is preferred between 20° and 50° C. As before, vinyl chloride is introduced in gaseous form. Depending upon the type of reactor, the reaction may be executed at pressures between 200–1000 p.s.i. Simply by using the limited group of catalysts described above in this conventional process, substantial yield and rate improvements are achieved.

The following experimental work will illustrate the type of improvements which can be expected. The data in Table I was obtained by polymerizing vinyl chloride in 6½ fluid oz. Coke bottles in which 94.0 grams of conventional frozen dispersing solution used in a suspension polymerization process was present. 0.00094 mole of the noted organic peroxide was added to the Coke bottle and 50.0 grams of vinyl chloride monomer was introduced. The use of equimolar amounts of catalyst adjusts for the differences in molecular weights of the compounds so that differences in results are due solely to the effectiveness of the molecules in this particular environment. After introduction of the reactants, the Coke bottle was capped, the contents almost melted, and the bottles placed in a rotating constant temperature bath for 6 hours at 40° C. The bottle was cooled, excess monomer was vented, and the PVC product was filtered, washed and dried. Comparison of the yields using the listed catalysts are as follows:

TABLE I

| Peroxide | Average PVC yield, g. | PVC yield, percent |
| --- | --- | --- |
| (1) Lauroyl peroxide | 6.05 | 12.1 |
| (2) Acetyl 2-ethyl hexanoyl peroxide | 35.5 | 71.0 |
| (3) Acetyl isobutyryl peroxide | 45.05 | 90.1 |
| (4) Acetyl cyclohexane carbonyl peroxide | 37.8 | 75.6 |
| (5) Acetyl 3,5,5-trimethyl hexanol peroxide | 6.5 | 13.0 |
| (6) Acetyl isovaleroyl peroxide | 25.0 | 50.0 |
| (7) Acetyl cyclohexene carbonyl peroxide | 14.8 | 29.6 |

The above results generally illustrate the substantial improvements in yield obtainable with unsymmetrical acyclic diacyl peroxides having an alpha branched carbon atom (compare samples 2 and 3 with sample 1). The utility of the mixed cyclic-acyclic compounds is also shown. (Compare samples 7 and 4 with sample 1.) It should also be noted that where the low molecular weight acyclics of the preferred embodiment are used, even the beta branched compound of sample 6 is superior to lauroyl peroxide while analogous beta branched materials of higher molecular weight provide no significant advantage. (See sample 5.) In general, the alpha branched acyclics are excellent. The relatively lower molecular weight (6–9 carbon atoms) are substantially more effective than the ones of higher molecular weight (compare sample 3 with sample 2).

In addition to increased yield, the present process provides increased speed of reaction. To illustrate this aspect of the discovery, experiments in the polymerization of vinyl chloride using the same general procedure described above in obtaining the results reported in Table I were conducted. The data obtained, in terms of percent yield of PVC with respect to time, is shown in Table II below. Again, a comparison is made with the standard lauroyl peroxide used in the PVC industry. In this series of experiments, catalyst concentration was 0.25% by weight of the monomer and the polymerization reaction was executed at 30° C.

TABLE II

| Peroxide | Percent of polyvinyl chloride yield Time, hours | | | | | | |
| --- | --- | --- | --- | --- | --- | --- | --- |
| | 1 | 2 | 4 | 6 | 8 | 12 | 24 |
| Acetyl 2-ethyl hexanoyl peroxide | 3.0 | 8.2 | 26.2 | 40.4 | 55.8 | 74.2 | 81.8 |
| Acetyl isobutyryl peroxide | 4.6 | 16.6 | 49.0 | 71.2 | 87.6 | 87.4 | 87.6 |
| Acetyl isovaleroyl peroxide | 0.4 | 3.2 | 9.8 | 16.8 | 23.8 | 51.6 | 82.6 |
| Acetyl cyclohexene carbonyl peroxide | 1.2 | 3.2 | 10.0 | 12.4 | 17.0 | 27.2 | 40.6 |
| Lauroyl peroxide | | | | | | | 10.6 |

The uniqueness of the applicability of the present process to PVC and its copolymers has been established by comparisons in which unsymmetrical alpha branched diacyl peroxides were used to initiate other types of monomers. As shown below in the following examples, the catalysts of the present process are of little or no value in other areas, as compared with other catalysts such as lauroyl peroxide and benzoyl peroxide which are most commonly used in connection with these other types of monomers.

EXAMPLE I

*Styrene.*—20 grams of styrene were weighed into 20 x 125 mm. culture tubes. 0.50% by weight of peroxide initiator was then added to each tube. The tubes were flushed with nitrogen and capped. The tubes were placed in a 60° C. oven for 8 hours. Then 10.0 grams of styrene was removed from the tubes, washed with methanol to remove unreacted monomer, and the residue was dried and weighed. The following results were observed:

Peroxide: Percent yield polystyrene
    Acetyle 2-ethyl hexanoyl peroxide _____ 7.4
    Lauroyl peroxide _____ 24.5
    Benzoyl peroxide _____ 18.3
    Acetyl 3,5,5 trimethyl hexanoyl peroxide ____ 28.0

EXAMPLE II

*Methyl methacrylate.*—20 grams of methyl methacrylate monomer containing 0.2% of peroxide initiator was added to 20 x 125 mm. culture tubes. A blank containing no initiator was included. The tubes were flushed with nitrogen, capped and placed in a 50° C. oven for the period of time noted below. If the sample gelled, the hardness of the gelled material was determined with a Barcol tester. The following results were observed:

| | Benzoyl peroxide | Lauroyl peroxide | Acetyl 2-ethyl hexanoyl peroxide | Blank |
| --- | --- | --- | --- | --- |
| Hours: | | | | |
| 48 | 45 to 50 | 40 to 45 | 5 | 0 |
| 120 | 52 to 55 | 40 to 48 | 10 to 15 | 0 |

EXAMPLE III

*Diallyl phathalate.*—20 grams of diallyl phthalate monomer containing 0.2% peroxide initiator was added to separate 20 x 125 mm. culture tubes. These tubes, together with a blank, were flushed with nitrogen, capped, and placed in a 50° C.-oven. Heating was conducted for 119 hours at 50° C. and then 166 hours at 70° C. Polymer content was determined by washing the sample with methanol, drying and weighing the residues at the times listed.

| Temp. | Benzoyl peroxide, percent | Acetyl 2-ethyl hexanoyl peroxide, percent | Blank, percent |
| --- | --- | --- | --- |
| Hours: | | | |
| 119 | 50° | 4 | 1 | 0 |
| 143 | 70° | [1] 26 | 1 | 0 |
| 165 | 70° | [2] 44 | 4 | 0 |
| 285 | 70° | [3] 54 | 5 | 0 |

[1] Viscous liquid.
[2] Soft rubbery solid
[3] ½ Rubbery solid.

Although the foregoing invention has been described in some detail by way of illustration and example for purposes of clarity of understanding, it is understood that certain changes and modifications may be practiced within the spirit of the invention as limited only by the scope of the appended claim.

What is claimed is:
1. In the method for making polyvinyl chloride by polymerizing vinyl chloride in the presence of 0.05–2.0% by weight of the monomer of a polymerization initiator at a temperature of from −20° to 90° C. under suspension polymerization conditions, the improved method wherein said polymerization initiator is selected from the group consisting of acetyl isobutyryl peroxide and acetyl isovaleroyl peroxide.

References Cited

UNITED STATES PATENTS 2,524,318  10/1950  Kharasch.
3,089,865  5/1963  Walther.

FOREIGN PATENTS 958,067  5/1964  Great Britain.
1,252,241  12/1960  France.

JAMES A. SEIDLECK, Primary Examiner

U.S. Cl. X.R.

260—93.5, 610